United States Patent [19]

Geppelt et al.

[11] Patent Number: 5,410,808
[45] Date of Patent: May 2, 1995

[54] METHOD OF MAKING A DOUBLE WALL TWIST TUBE

[75] Inventors: Elmo W. Geppelt; William H. Poore, both of Tulsa; Mark A. Smith, Broken Arrow, all of Okla.

[73] Assignee: G.P. Industries, Inc., Tulsa, Okla.

[21] Appl. No.: 21,881

[22] Filed: Feb. 24, 1993

[51] Int. Cl.$^6$ .................................... B23P 15/00
[52] U.S. Cl. ............................. 29/890.036; 29/507
[58] Field of Search ............ 29/890.36, 505–509; 72/299, 64, 68

[56] References Cited

U.S. PATENT DOCUMENTS

| | | | |
|---|---|---|---|
| Re. 24,783 | 2/1960 | Humphrey et al. | 153/71 |
| 2,715,431 | 8/1955 | Grossu | 153/35 |
| 2,729,266 | 1/1956 | Humphrey | 153/71 |
| 3,015,355 | 1/1962 | Humphrey | 153/78 |
| 3,375,690 | 4/1968 | Fink | 72/64 |
| 3,533,267 | 10/1970 | Bunnell | 72/299 |
| 3,730,229 | 5/1973 | D'Onofrio | 138/114 |
| 3,777,343 | 12/1973 | D'Onofrio | 29/157.3 R |
| 3,885,298 | 5/1975 | Pogonowski | 29/507 |
| 4,059,004 | 11/1977 | Perkins | 72/299 |
| 4,171,634 | 10/1979 | Perkins | 72/299 |
| 4,203,312 | 5/1980 | Perkins | 72/299 |
| 4,377,083 | 3/1983 | Shepherd et al. | 72/68 |
| 4,437,329 | 3/1984 | Geppelt et al. | 72/299 |
| 4,451,966 | 6/1984 | Lee | 29/890.036 |
| 4,538,337 | 9/1985 | Holbrook et al. | 29/890.036 |
| 4,995,450 | 2/1991 | Geppelt et al. | 165/104.21 |
| 5,002,119 | 3/1991 | Geppelt et al. | 165/79 |
| 5,092,038 | 3/1992 | Geppelt et al. | 29/890.048 |

FOREIGN PATENT DOCUMENTS 3927989 3/1991 Germany ............. 29/890.036

Primary Examiner—Irene Cuda
Attorney, Agent, or Firm—Head & Johnson

[57] ABSTRACT

A double wall twist tube is formed from at least two tubular blanks with a smaller tubular blank forming the inner wall and a larger tubular blank forming the outer wall. The smaller tubular blank is located within the larger tubular blank and the tubular blanks are each impressed with at least one indentation near one end. Sleeves are inserted into ends of the smaller tubular blank and a mandrel is inserted through the sleeves. Clamping chuck jaws or other clamping devices are provided on a longitudinally movably non-rotatable tail stock squeeze the indented end of the larger tubular blank, securing it to the indented end of the smaller tubular blank and simultaneously securing the tubular blanks to the tail stock. Clamping chuck jaws or other clamping devices are provided on a rotatable head stock squeeze the opposite end of the larger tubular blank, securing it to the opposite end of the smaller tubular blank and simultaneously securing the tubular blanks to the head stock. Rotation of the head stock causes the tubular blanks to undergo torsional stress which creates spiral corrugations to be formed beginning at and extending from the indentation to the head stock. The tail stock moves toward the head stock and the mandrel moves through the sleeves in response to shortening of the twist tube caused by spiral corrugations being formed therein.

13 Claims, 1 Drawing Sheet

METHOD OF MAKING A DOUBLE WALL TWIST TUBE

BACKGROUND OF THE INVENTION

1. Field of the Invention

The present invention relates to a method of producing double or multiple wall spirally twist tubes. Spiral tubes are normally used for heat exchange applications in which heat is exchanged between a gaseous or fluid medium circulating through the tubes and a second gaseous or fluid medium circulating exterior to the tubes. A leak detector space is provided between the walls of the present invention which can be monitored to detect leakage occurring in the walls prior to the mediums commingling.

2. Description of the Related Art

Several inventions relate to forming single wall twist tubes as revealed by the number of patents included in the accompanying Information Disclosure Statement. U.S. Pat. No. 4,437,329 issued Mar. 20, 1984 to the inventor of the present invention, and which is hereby incorporated in this application by reference, reveals one method of manufacturing twist tubes.

Twist tubes are often used in heat exchange applications because of the increased surface area provided by the twist or convolutions in the tubes. The convolutions increase the surface area of the twist tubes, thus increasing the heat exchange which occurs between either gaseous or fluid medium exterior to the tubes and either gaseous or fluid medium located interior in the tubes.

However, when in use in heat exchange applications, the single wall of an existing twist tube can fail or be breached. When this happens, the medium exterior to the tube and the medium interior in the tube will commingle. Commingling will occur either exterior to the tube or interior in the tube, depending on the relative pressures of the two mediums. Commingling of the mediums is normally undesirable and is particularly undesirable when one medium is a potable water supply, a high purity process stream, or a toxic material.

Need for a double or triple wall twist tube has been identified as evidenced by U.S. Pat. No. 3,730,229 issued on May 1, 1973 and U.S. Pat. No. 3,777,343 issued on Dec. 11, 1973, both issued to inventor Mario L. D'Onofrio. However, both of these patents involve double or triple wall twist tubes which are made by twisting the tubes one at a time instead of twisting all the tubes simultaneously as taught by the present invention. Creation of multiple wall twist tubes utilizing one twisting process instead of multiple twisting processes reduces manufacturing cost, reduces production time, and forms a more unitary twist tube.

The present invention addresses the problem of commingling by providing a double wall twist tube created in one twisting operation which has the desirable heat exchange properties of a single wall twist tube. The present invention is provided with at least two walls to prevent commingling should one wall fail or be breached, and is provided with a leak detector space between its walls to allow monitoring of tube leakage. When one of the walls fails or is breached, medium flows into the leak detector space through the breached wall and travels toward the ends of the tube. The ends can be provided with means for detecting leakage. The means for detecting leakage can be as simple as visually inspecting the ends of the tubes for presence of either of the mediums. When leakage is found, the leaking tube can be either plugged or replaced, thus, preventing the two mediums from commingling.

SUMMARY OF THE INVENTION

The present invention is briefly a double or multiple wall twist tube formed in a single twisting operation from a larger tubular blank which forms the outer wall of the twist tube and from at least one smaller tubular blank provided concentrically inside the larger tubular blank, with the innermost smaller tubular blank forming the inner wall of the twist tube. A leak detector space is provided between the walls. In order to form the double or multiple wall twist tube, at least one indentation is impressed in the concentrically nested tubular blanks near one end thereof. A sleeve is inserted into each end of the innermost smaller tubular blank and a mandrel movably inserts through the sleeves. Clamping chuck jaws of a non-rotatable tail stock are clamped onto the end of the larger tubular blank which is provided with the indentation, and clamping chuck jaws of a rotatable head stock are clamped onto the other end of the larger tubular blank. The larger tubular blank is compressed by the clamping chuck jaws, securing it to the innermost smaller tubular blank, but not compressed so securely so as to totally eliminate the leak detector space. The head stock is then rotated by means of an attached motor driven gear box, simultaneously causing torsional twisting stress on the tubular blanks and forming coinciding spiral corrugations in each tubular blank beginning at and extending from the indentation toward the head stock, thus forming the twist tube. The tail stock is movably mounted on a slideway which allows the tail stock to move toward the head stock in response to shortening of the tubular blanks as the twist tube is formed. The mandrel also slides within the sleeves as the tail stock moves toward the head stock.

DETAILED DESCRIPTION OF THE PREFERRED EMBODIMENTS

Figure 2:
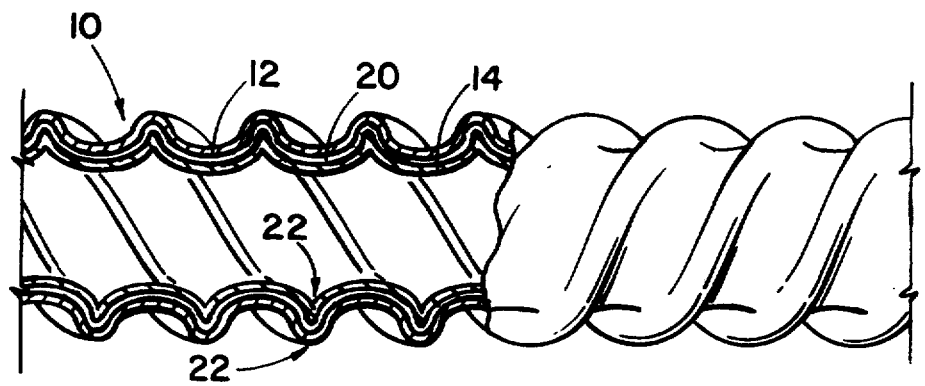
FIG. 2 is a partially cut-away side elevation of a double wall twist tube constructed according to a preferred embodiment of the present invention.
Figure 4:
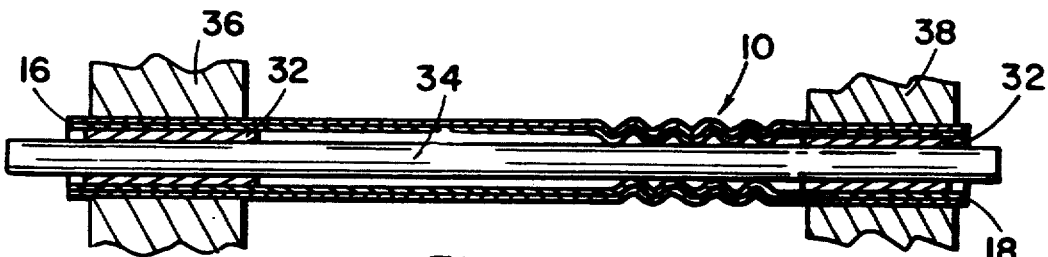
FIG. 4 is a fragmentary cross-sectional view of the partially formed double wall twist tube of FIG. 3 showing the internal details of its attachment to the lathe-like apparatus.

Referring to the drawings and initially to FIG. 2, there is illustrated a double wall twist tube 10 constructed according to a preferred embodiment of the present invention. The twist tube 10 is provided with a continuous outer wall 12 and a continuous inner wall 14 located concentrically within the outer wall 12. A leak detector space 20 is provided between the outer and inner walls 12 and 14. The outer and inner walls 12 and 14 are also provided with coinciding spiral corrugations 22. As illustrated in FIG. 4, the outer and inner walls 12 and 14 are continuous with a first end 16 and an opposite second end 18 of the twist tube 10.

Figure 1:
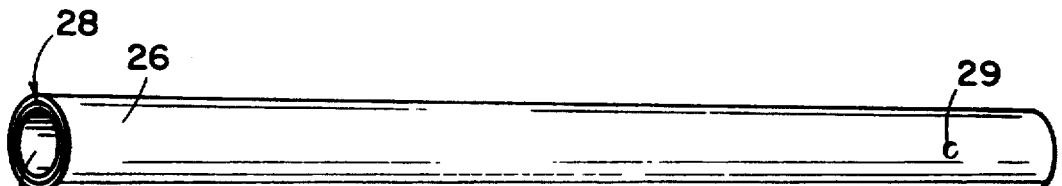
FIG. 1 is a perspective view of two tubular blanks with a smaller tubular blank being concentrically contained inside a larger tubular blank.

Referring now to FIG. 1 and 2, the twist tube 10 is formed from two tubular blanks, a smaller tubular blank 24 and a larger tubular blank 26. The smaller tubular blank 24 has an outside diameter slightly smaller than an inside diameter of the larger tubular blank 26 so that the smaller tubular blank 24 lies concentrically within the larger tubular blank 26 and extends through the larger tubular blank 26 with a space 28 formed therebetween. When the tubular blanks 24 and 26 are twisted, as will be described below, the smaller tubular blank 24 forms the inner wall 14 of the twist tube 10, the larger tubular blank 26 forms the outer wall 12 of the twist tube 10, and the space 28 forms the leak detector space 20 of the twist tube 10.

As illustrated in FIG. 1 and 4, the tubular blanks 24 and 26 are each impressed with at least one dimple-like indentation 29 which will serve as a starting point for forming the spiral corrugations 22 when the tubular blanks 24 and 26 are twisted. The indentations 29 are located at ends of tubular blanks 24 and 26 which will become the second end 18 of the twist tube 10. Opposite ends of the tubular blanks 24 and 26 will become the first end 16 of the twist tube 10. Hereinafter the ends of the tubular blanks 24 and 26 which will form the first end 16 will be referred to as the first end 16 and the ends of the tubular blanks 24 and 26 which will form the second end 18 will be referred to as the second end 18.

Figure 3:
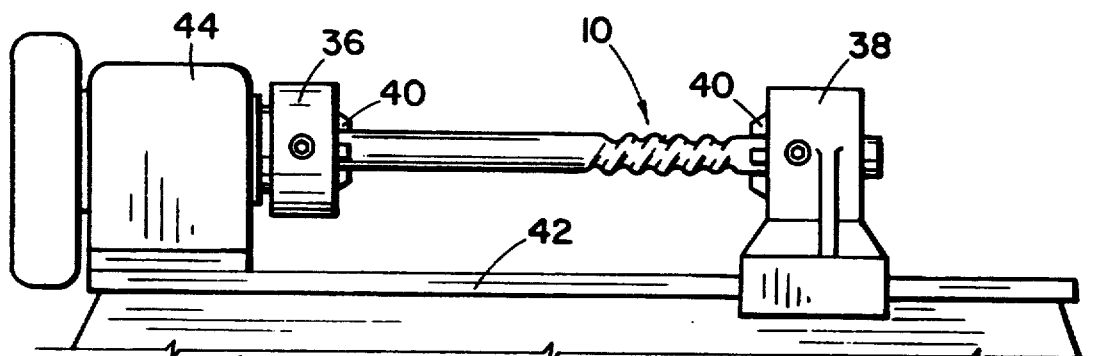
FIG. 3 is a side elevation of a lathe-like apparatus being used to form a double wall twist tube.

FIGS. 3 and 4 illustrate how the smaller and larger tubular blanks 24 and 26 are secured to a lathe-like apparatus 30. First, a sleeve 32, having an external diameter slightly smaller than an inside diameter of the smaller tubular blank 24, is inserted into each end of the smaller tubular blank 24. The sleeves 32 are provided with an internal diameter slightly larger than a uniform diameter of a mandrel 34 allowing the mandrel 34 to movably extend through the sleeves 32. Next, the first end 16 and the second end 18 are secured respectively to a rotatable head stock 36 and a non-rotatable tail stock 38 of the lathe-like apparatus 30.

Means for attaching the smaller and the larger tubular blanks 24 and 26 to the lathe-like apparatus 30 are preferably clamping chuck jaws 40 provided both on the head stock 36 and on the tail stock 38 which press against the ends of the larger tubular blank 26 and cause the larger tubular blank 26 to be compressed around the smaller tubular blank 24 at ends 16 and 18. By compressing the larger tubular blank 26 around the smaller tubular blank 24, the clamping chuck jaws 40 secure the tubular blanks 24 and 26 to the lathe-like apparatus 30 and also secure the blanks 24 and 26 together. However, the tubular blanks 24 and 26 are not secured together at the ends 16 and 18 so tightly as to totally eliminate the leak detector space 20. The second end 18 is secured to the non-rotatable tail stock 38 so that the indentation 29 is adjacent the tail stock 38 and located between the head stock 36 and the tail stock 38.

The non-rotatable tail stock 38 is slidably mounted to a slideway 42. The slideway 42 also attaches to a motor driven gear box 44 to which the head stock 36 attaches. The motor driven gear box 44 rotates the head stock 36 and the attached first end 16, while the second end 18 is prevented from rotating by its attachment to the non-rotatable tail stock 38. Rotation of the first end 16 causes torsional twisting stress to be exerted simultaneously on the smaller and larger tubular blanks 24 and 26, forming the spiral corrugations 22 therein beginning at and extending from the indentation 29 toward the rotating head stock 36. As rotation continues and the tubular blanks 24 and 26 are transformed into the twisted tube 10, the tail stock 38 slides on the slideway 42 toward the head stock 36 in response to reduction in length of the tubular blanks 24 and 26 as they are spirally corrugated.

Also, as the spiral corrugations 22 are formed, the mandrel 34 serves to create a uniform internal diameter within the twist tube 10 while preventing torsional stress from causing the twist tube 10 to collapse. As the tail stock 38 moves toward the head stock 36 in response to shortening of the twist tube 10, the mandrel 34 slides through the sleeves 32 and is thus functionally shortened in length in response to shortening of the twist tube 10. Rotation of the head stock 36 stops when the spiral corrugations 22 reach the head stock 22. The twist tube 10 is then released from the head and tail stocks 36 and 38 and is ready for use.

In order for the outer and inner walls 12 and 14 to form coinciding spiral corrugations 22, the smaller tubular blank 24 and the larger tubular blank 26 must be matched so that they have the same twist capability and, therefore, will form spiral corrugations 22 which coincide. If the tubular blanks 24 and 26 do not have the same twist capability, the resulting spiral corrugations (not illustrated) will not coincide. In order to form coinciding spiral corrugations 22, it is not necessary that the smaller and larger tubular blanks 24 and 26 be composed of the same material.

The leak detector space 20 between the inner and outer tube is not uniform. In many places the inner and outer tube touch which is advantageous since this increases heat transfer between the tubes. However, the space 20 is continuous and a leak detecting path between one end and the other of the twisted tube is always present.

Although the present invention has been described for a double wall twist tube 10, triple wall twist tubes (not shown) and other multiple wall twist tubes (not shown) are included in the invention. Also, although the spiral corrugations 22 have been described as coinciding, other non-coinciding spiral corrugation configurations are possible.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A method of producing a double wall twist tube having an inside wall, an outside wall and space therebetween comprising the following steps:
  (a) positioning a smaller tubular blank within a larger tubular blank, the tubular blanks being of substantially the same length;
  (b) grasping said tubular blanks adjacent a first end with a rotatable means;
  (c) grasping said tubular blanks adjacent a second end with a stationary means; and
  (d) rotating said first end of said tubular blanks relative to said second end to form at least one spiral corrugation simultaneously in said larger and smaller tubular blanks.

2. A method according to claim 1 including the step of inserting a mandrel within said smaller tubular blank before step (d).

3. A method of according to claim 1 wherein spacing between said rotatable means and said stationary means varies as said first end of said tubular blanks is rotated relative to said second end.

4. A method according to claim 1 including the step of inserting a sleeve in each end of said smaller tubular blank before step (c).

5. A method according to claim 4 including the step of inserting a mandrel within said sleeves before step (c).

6. A method according to claim 1 including the step of forming at least one indentation in at least said larger tubular blanks to form a point of reduced torsional force resistance prior to step (d).

7. A method of producing a double wall twist tube according to claim 1 wherein the smaller and larger tubular blanks have the same twist characteristics so that when like rotation is applied to the tubular blanks, the spiral corrugations which are formed therein coincide.

8. A method of producing a double wall twist tube according to claim 1 wherein in step (b) the tubular blanks are grasped adjacent the first end thereof by means of clamping chuck jaws.

9. A method of producing a double wall twist tube according to claim 1 wherein in step (c) the tubular blanks are grasped adjacent the second end thereof by means of clamping chuck jaws.

10. A method of producing a double wall twist tube according to claim 1 wherein in steps (b) and (c) said tubular blanks are secured at said first and said second ends thereof by said clamping chuck jaws supported respectively by said rotatable means and said stationary means.

11. A method of producing a double wall twist tube according to claim 6 wherein in said at least one indentation is formed so that each spiral corrugation formed in said smaller tubular blank coincides with a spiral corrugation formed in the larger tubular blank.

12. A method of producing a multiple wall twist tube comprising the following steps:
   (a) placing at least one smaller tubular blank concentrically within a larger tubular blank, the tubular blanks being spaced slightly apart and being of substantially identical length;
   (b) inserting a sleeve in each end of said smaller tubular blank, and removably inserting a mandrel through the sleeves;
   (c) grasping the larger tubular blank adjacent a first end with a rotatable motor driven head stock;
   (d) grasping the larger tubular blank adjacent a second end with a non-rotating tail stock, said tail stock being movable toward said head stock;
   (e) forming at least one indentation as a point of reduced resistance to torsional force in each said tubular blank adjacent said second end thereof, which step can be accomplished before or after steps (a), (b) and (c); and
   (f) rotating said head stock to initiate and extend formation of at least one spiral corrugation in each tubular blank.

13. A method of producing a multiple wall twist tube according to claim 11 wherein in step (e) the indentations are formed so that in step (f) the spiral corrugations formed in the tubular blanks coincide.

* * * * *